United States Patent
Hatton

(10) Patent No.: US 10,053,920 B2
(45) Date of Patent: Aug. 21, 2018

(54) RISER SYSTEM

(71) Applicant: Magma Global Limited, Portsmouth (GB)

(72) Inventor: Stephen Anthony Hatton, Woking (GB)

(73) Assignee: Magma Global Limited, Portsmouth (GB)

( * ) Notice: Subject to any disclaimer, the term of this patent is extended or adjusted under 35 U.S.C. 154(b) by 0 days.

(21) Appl. No.: 15/544,248

(22) PCT Filed: Dec. 31, 2015

(86) PCT No.: PCT/GB2015/054179
§ 371 (c)(1),
(2) Date: Jul. 17, 2017

(87) PCT Pub. No.: WO2016/116731
PCT Pub. Date: Jul. 28, 2016

(65) Prior Publication Data
US 2018/0002988 A1    Jan. 4, 2018

(30) Foreign Application Priority Data
Jan. 19, 2015  (GB) .................................. 1500881.6

(51) Int. Cl.
*E21B 17/01*     (2006.01)
*E21B 17/08*     (2006.01)
(Continued)

(52) U.S. Cl.
CPC ........ *E21B 17/012* (2013.01); *B63B 35/4413* (2013.01); *E21B 17/085* (2013.01);
(Continued)

(58) Field of Classification Search
CPC ........ E21B 19/02; E21B 19/002; E21B 19/22; E21B 17/01; E21B 17/012; E21B 19/006;
(Continued)

(56) References Cited

U.S. PATENT DOCUMENTS

| 4,423,983 | A  | * | 1/1984  | Dadiras  | E21B 19/006 166/350 |
| 2006/0137884 | A1 | * | 6/2006  | Torres   | E21B 17/026 166/380 |
| 2012/0312544 | A1 | * | 12/2012 | Tavner   | E21B 17/085 166/367 |

FOREIGN PATENT DOCUMENTS

| GB | 2 179 017   |   | 2/1987 |            |
| GB | 2179017   A | * | 2/1987 | E21B 19/002 |

(Continued)

*Primary Examiner* — James G Sayre
(74) *Attorney, Agent, or Firm* — Levy & Grandinetti

(57) ABSTRACT

A riser system with a primary conduit extends between a surface vessel and a subsea location and an auxiliary conduit that extends adjacent the primary conduit. In one example a composite jumper conduit extends from the surface vessel and is fluidly connected to the auxiliary conduit. The jumper conduit includes a composite material formed of at least a matrix and one or more reinforcing elements embedded within the matrix. In one example a subsea composite jumper conduit extends from subsea infrastructure and is fluidly connected to the auxiliary conduit. The subsea jumper conduit includes a composite material formed of at least a matrix and one or more reinforcing elements embedded within the matrix.

30 Claims, 4 Drawing Sheets

(51) Int. Cl.
*F16L 9/128* (2006.01)
*E21B 19/00* (2006.01)
*B63B 35/44* (2006.01)
*F16L 47/24* (2006.01)
*F16L 47/14* (2006.01)

(52) U.S. Cl.
CPC ............ *E21B 19/006* (2013.01); *F16L 9/128* (2013.01); *E21B 17/01* (2013.01); *F16L 47/14* (2013.01); *F16L 47/24* (2013.01)

(58) Field of Classification Search
CPC . F16L 47/14; F16L 47/24; F16L 9/128; B63B 35/4413
See application file for complete search history.

(56) References Cited

FOREIGN PATENT DOCUMENTS

| | | |
|---|---|---|
| GB | 2486333 | 6/2012 |
| GB | 2504687 | 2/2014 |
| WO | WO 2012/095633 | 7/2012 |
| WO | WO 2012/143671 | 10/2012 |
| WO | WO 2012/143672 | 10/2012 |

\* cited by examiner

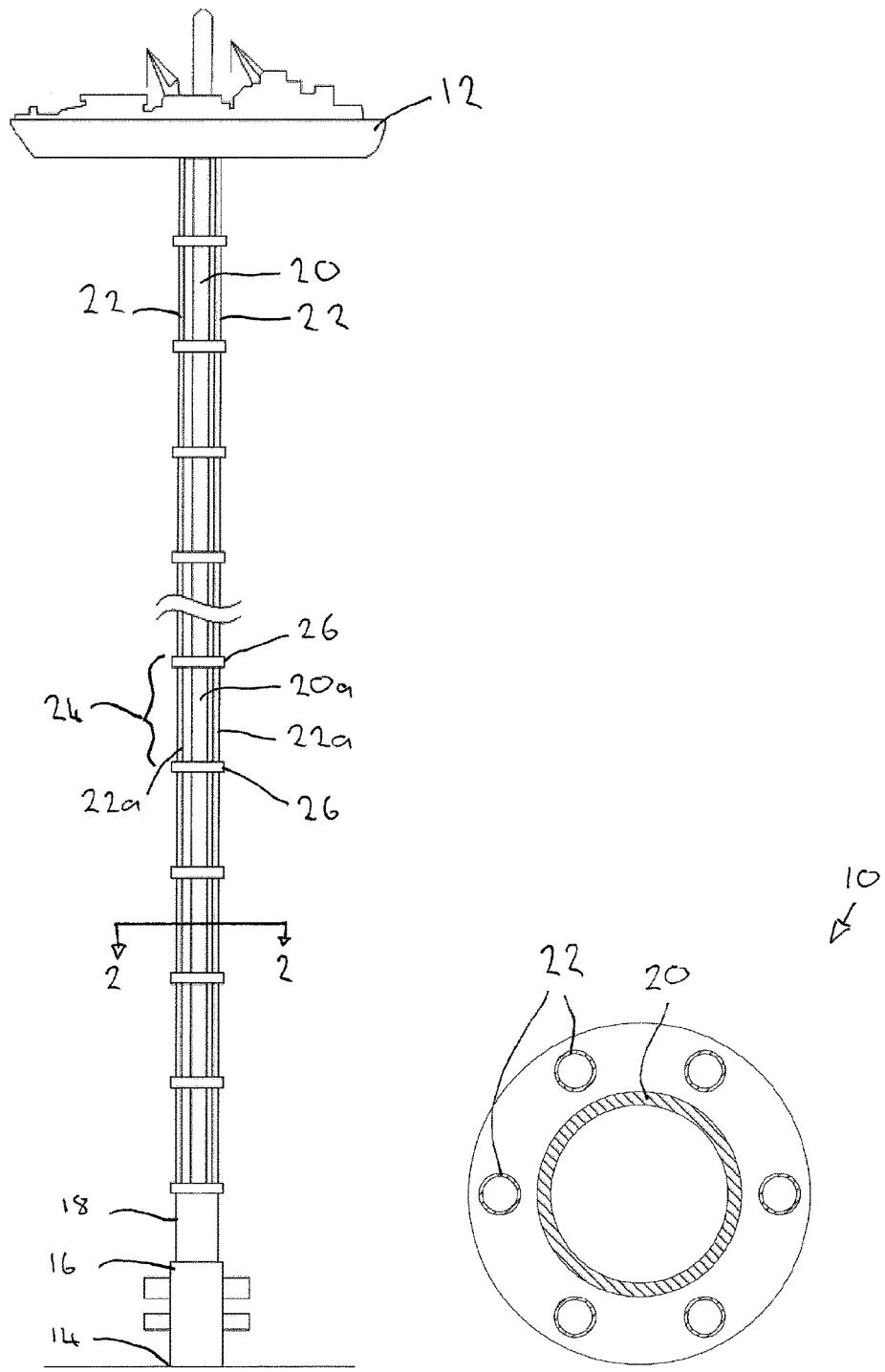

RISER SYSTEM

FIELD

The present invention relates to a riser system, and in particular, but not exclusively, to a drilling riser system comprising a primary riser conduit and one or more auxiliary conduits extending adjacent the primary riser conduit.

BACKGROUND

In the oil and gas industry subsea wellbores are drilled from surface vessels, such as drill ships, semi-submersible rigs, jack-up rigs and the like, as is well known in the art. Typically, a drilling riser is provided which extends to span the water column between the wellhead and a surface vessel to provide a contained passage for equipment and fluids. To this extent the drilling riser normally includes a large bore central riser pipe which accommodates the drilling equipment and certain fluids, such as drilling fluids and wellbore fluids, and a number of auxiliary or peripheral conduits which extend alongside the central riser pipe and provide communication of control fluids, well kill fluids, choke fluids, hydraulic power fluid and the like. Such auxiliary lines may terminate at the wellhead, for example at a Blow Our Preventer (BOP). In some applications the central riser pipe may define an internal diameter of around 21 inches (53.34 cm), and the auxiliary lines may be in the range of 2-4 inches (5.08-10.16 cm) internal diameter.

The drilling riser is typically formed from a number of individual sections or joints which are secured together in end-to-end relation. Each individual joint includes the required auxiliary lines arranged around a length of riser pipe, wherein the ends of the riser pipe and auxiliary lines are terminated at opposing flange connectors. During deployment, the individual sections or joints are secured together via the flange connectors, with appropriate seals utilised.

The auxiliary lines are typically pressure rated to the shut-in pressure of the wellhead and consequently are thick walled and relatively heavy. To reduce the riser top tension needed to safely support the riser during operation external buoyancy is often added to each joint to reduce the in-water weight. However, this buoyancy has the disadvantage of increasing the joint outside diameter and also the in air weight, and the buoyancy adds to problems associated with riser joint topside handling and storage. It also presents problems during deployed operation adding significantly to the riser hydrodynamic drag.

The central pipe is extended up to the drill floor of the surface vessel whilst the auxiliary lines are terminated at an elevation below the drill floor, typically within the moonpool. Pressure rated fluid connections are made between the top of the auxiliary lines to piping headers on the vessel. These connections are achieved using flexible jumpers. These flexible jumpers accommodate the relative motion between the riser and vessel which may arise due to a combination of vertical heave and angular rotations. These flexible jumpers are critical items since they must be flexible and reliably accommodate the full wellhead pressure during periods of pressure testing and emergency well control.

To accommodate the relative vertical heave and angular motions, known flexible jumpers are configured in free hanging catenaries connected to steel goosenecks at the top end of each auxiliary line. In order to meet the spatial constraints of the moonpool the flexible jumpers typically must accommodate a small minimum bend radius, which is a significant design challenge. Also, high pressure ratings will require a significant steel content, thus resulting in high weight.

At the seabed end of the drilling riser, similar flexible jumpers are used to connect across a lower flex joint interfacing between the dynamic lowermost riser joint and a static Lower Marine Riser Package (LMRP). In this application the flexible jumpers typically only need to accommodate angular motions but must additionally accommodate the challenge of high hydrostatic pressures that can cause collapse of the jumpers, particularly when subjected to simultaneous bending.

These flexible jumpers are critical to well control procedures and the safe operation of the drilling system. However, experience shows that such jumpers often need to be replaced due to damage and they are difficult to handle because of their high weight and stiffness. A further limitation of these flexible jumpers is that they are limited in pressure rating and suffer from fatigue damage particularly when they are operated with high temperatures and with sour fluid conditions. This causes operational difficulties and downtime.

The auxiliary conduits also provide many challenges in terms of high weight, corrosion and internal fluid cleanliness and their poor reliability resulting from many seals between each joint. These seals need to be regularly replaced and during riser installation regular pressure testing is necessary which takes time and when failures are detected riser sections need to be pulled back taking additional time. However, currently there has been no practical solution to eliminating the need for these seals due to handling constraints. Consequently the drilling industry has overcome these problems by adding large qualities of buoyancy and rigorous procedures to inspect, maintain and replace seals and seal surfaces.

SUMMARY

An aspect or embodiment relates to a riser system, comprising:
 a primary conduit extending between a surface vessel and a subsea location;
 an auxiliary conduit extending adjacent the primary conduit; and
 a composite jumper conduit extending from the surface vessel and being fluidly connected to the auxiliary conduit, said jumper conduit comprising a composite material formed of at least a matrix and one or more reinforcing elements embedded within the matrix.

The riser system may be any riser system, such as any marine riser system. The riser system may comprise or define a drilling riser system. The riser system may comprise or define an intervention or workover riser system.

The primary conduit may accommodate drilling equipment and certain fluids, such as drilling fluids. The auxiliary conduit may accommodate fluid communication of certain fluids, such as control fluids, well kill fluids, booster fluids, choke fluids, hydraulic power fluids or the like between the surface vessel and subsea location.

The composite jumper conduit may accommodate relative motion between the vessel and the primary and/or auxiliary conduits.

The composite material of the composite jumper conduit may exhibit a higher strain rate to specific stress than an equivalent metallic component. As will be appreciated by those of skill in the art, an equivalent metallic component may be one which defines the same pressure rating as the composite auxiliary conduit. Accordingly, the composite material may permit the jumper conduit to satisfactorily accommodate deformation, for example significant deformation, such as may be caused by tensile forces, compressive forces, bending forces, torsional forces, hoop forces, such as from pressure (internal and/or external), and the like.

The composite material of the composite jumper conduit may be configured to withstand or permit axial and/or bending strains of up to 6%, up to 4%, up to 2% or up to 1%. Such permitted strains for the composite material may be significantly larger than a maximum permitted strain for a conventional material such as steel, aluminium or the like. Accordingly, a jumper conduit comprising such a composite material may provide a compliant conduit by virtue of the properties of the composite material alone. Thus, the response of the jumper conduit to dynamic loading, for example, and events of excessive deformation may become of less concern to a riser designer and operator. That is, the strain capabilities of the composite material may assist in accommodating relative motion between the vessel and the auxiliary and/or primary conduits.

The matrix of the composite material of the jumper conduit may comprise a polymer material. The matrix of the jumper conduit may comprise a thermoplastic material. The matrix of the jumper conduit may comprise a thermoset material. The matrix of the jumper conduit may comprise a polyaryl ether ketone, a polyaryl ketone, a polyether ketone (PEK), a polyether ether ketone (PEEK), a polycarbonate or the like, or any suitable combination thereof. The matrix of the jumper conduit may comprise a polymeric resin, such as an epoxy resin or the like.

The reinforcing elements of the composite material of the jumper conduit may comprise continuous or elongate elements. The reinforcing elements of the jumper conduit may comprise any one or combination of polymeric fibres, for example aramid fibres, and/or non-polymeric fibres, for example carbon, basalt elements or the like. The reinforcing elements of the jumper conduit may comprise fibres, strands, filaments, nanotubes or the like. The reinforcing elements of the jumper conduit may comprise discontinuous elements.

The matrix and the reinforcing elements of the composite material of the jumper conduit may comprise similar or identical materials. For example, the reinforcing elements may comprise the same material as the matrix, albeit in a fibrous, drawn, elongate form or the like.

At least a portion of the riser system may extend through a moonpool of the vessel. For example, the primary conduit may extend upwardly through the moonpool. In some embodiments the auxiliary conduit may terminate in the region of the moonpool of the vessel.

The jumper conduit may extend upwardly from the auxiliary conduit. The jumper conduit may extend upwardly in a curved profile from the auxiliary conduit. Such a curved profile may assist to accommodate appropriate routing of the jumper conduit to accommodate vessel infrastructure. Further, such a curved profile may assist to accommodate relative motion between the vessel and the auxiliary conduit and/or primary conduit. The curvature of the jumper conduit may vary during relative motion of the vessel and the auxiliary and/or primary conduits.

The composite jumper conduit may extend upwardly from the auxiliary conduit in a generally convex curved profile. More specifically, the composite jumper conduit may extend from the auxiliary conduit to define an upwardly convex curved profile (or a downwardly concave profile). For example, the composite jumper may extend from the auxiliary conduit to immediately extend into an upwardly convex profile.

The deployed shape or profile, for example curvature of the jumper conduit may be optimised, for example analytically, such that said jumper conduit can accommodate relative motions between the vessel and the auxiliary and/or primary conduit without, for example, compromising minimum bend radii.

The composite jumper conduit may extend in a non-sagging or non-catenary manner. Such an arrangement may assist to minimise the space requirements of the jumper conduit. Further, such an arrangement may provide advantages in very high pressure applications (such as up to and beyond 20 Kpsi (1378 Bar)). For example, a sagging pipe component containing extremely high pressures may become extremely stiff and thus largely non-compliant.

In some embodiments the jumper conduit may be located entirely above the auxiliary conduit.

The jumper conduit may extend to define an elbow-form.

The jumper conduit may extend in a curved profile without defining any inflection point.

The jumper conduit may extend from a generally vertical orientation adjacent the auxiliary conduit, to a generally horizontal orientation on or adjacent the vessel. A continuous generally convex curve may be defined between the vertical and horizontal oriented sections of the jumper conduit.

The jumper conduit may be connected to a fluid system on the vessel. Such a fluid system may include a fluid source, pipework, pump systems and the like.

The jumper conduit may be connected to a rigid structure on the vessel.

The jumper conduit may be connected to a compliant structure on the vessel. The jumper conduit may be connected to a movement compensator on the vessel.

The jumper conduit may be mounted on a reel located on the vessel. For example, at least a portion of the length of the jumper conduit may be wound on the reel. In such an arrangement an outboard end of the jumper conduit may extend from the reel to be fluidly connected to the auxiliary conduit, and an inboard end of the jumper conduit may be connected to a fluid system on the vessel.

The reel may be operated to rotate to selectively pay-in and pay-out the jumper conduit therefrom. This may facilitate a degree of compensation to accommodate relative movement between the vessel and the auxiliary and/or primary conduits. The reel may be operated or adjusted through or in response to various parameters, for example sensed parameters, such as tension variations in the jumper conduit, heave motion of the vessel, departure angles at the point where the jumper conduit leaves the reel or the like.

The reel may be mounted on a skid arrangement mounted on the vessel. The skid arrangement may facilitate movement of the reel on the vessel. Such movement may be provided in accordance with vessel operations. Alternatively, or additionally, such movement may be provided to provide a degree of heave compensation, for example.

In some embodiments the reel may be utilised during initial deployment of the jumper conduit.

In some cases the ability to provide the jumper conduit directly from a reel may permit a common reeled length of jumper conduit to be utilised over multiple applications, with only the necessary length deployed from the reel as desired.

The jumper conduit may be guided by a guide structure or arrangement, such as provided by one or more guide rollers.

The riser system may comprise a jumper conduit tensioning arrangement. Such an arrangement may be configured to assist in controlling tension applied along or in discrete portions of the jumper conduit. The jumper conduit tensioning arrangement may comprise a hydraulic, pneumatic, mechanical or the like tensioning arrangement.

In some embodiments the jumper conduit tensioning arrangement may permit adjustments to be made to accommodate for operational condition changes during use, for example to accommodate for changes in fluid content density, pressure or the like.

The riser system may comprise a primary conduit tensioning arrangement. Such an arrangement may function to maintain at least a portion, for example the entire primary conduit in tension. The primary conduit tensioning arrangement may provide a degree of movement compensation. The primary conduit tensioning arrangement may comprise a hydraulic, pneumatic, mechanical or the like tensioning arrangement.

The riser system may comprise a continuous primary conduit. For example, the primary conduit may be provided as a unitary component. In such an arrangement the primary conduit may be deployed from a spool, directly as it is manufactured, or the like.

The riser system may comprise a modular primary conduit. The primary conduit may comprise a plurality of discrete primary conduit sections or joints secured together in end-to-end relation along the length of the riser system. In such an arrangement individual discrete primary conduit sections or joints may be secured together via respective connectors, such as flange connectors.

In one embodiment each discrete primary conduit section or joint may comprise a connector at opposing axial ends thereof, wherein the connectors are used to facilitate connection with adjacent primary conduit sections or joints.

The primary conduit may comprise a metal or metal alloy.

The primary conduit may comprise a composite material formed of at least a matrix and one or more reinforcing elements embedded within the matrix. The primary and jumper conduits may comprise a similar composite material construction.

The auxiliary conduit may comprise a continuous auxiliary conduit. For example, the auxiliary conduit may be provided as a unitary component. In such an arrangement the auxiliary conduit may be deployed from a spool or reel, directly as it is manufactured, or the like. Providing a unitary auxiliary conduit may assist to minimise issues associated with sealing, such as requirements for multiple seal integrity testing during deployment, requirements to retrieve faulty seals and associated riser components and the like.

The riser system may comprise a modular auxiliary conduit. The auxiliary conduit may comprise a plurality of discrete auxiliary conduit sections secured together in end-to-end relation along the length of the riser system. In such an arrangement individual discrete auxiliary conduit sections may be secured together via respective connectors, such as flange connectors.

In one embodiment each discrete auxiliary conduit section may comprise a connector at opposing axial ends thereof, wherein the connectors are used to facilitate connection with adjacent auxiliary conduit sections.

Adjacent discrete auxiliary conduit sections may be secured relative to each other in end-to-end relation to define a continuous auxiliary conduit.

Adjacent discrete auxiliary conduit sections may be rigidly secured together. Adjacent discrete auxiliary conduit sections may be rigidly secured together in at least one plane or direction. Adjacent discrete auxiliary conduit sections may be rigidly secured together in an axial direction. That is, relative axial movement of adjacent auxiliary conduit sections may be restricted or prevented at the region of connection therebetween.

Adjacent discrete auxiliary conduit sections may be compliantly secured together, for example in at least one plane or direction. Adjacent discrete auxiliary conduit sections may be compliantly secured together in an axial direction. That is, relative axial movement of adjacent auxiliary conduit sections may be permitted at the region of connection therebetween. Such a compliant connection may minimise the transference of load between different auxiliary conduit sections.

The riser system may comprise a plurality of riser joint sections coupled together in end-to-end relation. Each riser joint section may comprise a section of primary conduit and a section of auxiliary conduit coupled together via opposing end connectors. Adjacent riser joint sections may be secured together via the respective end connectors.

The auxiliary conduit may comprise a metal or metal alloy.

The auxiliary conduit may comprise a composite material formed of at least a matrix and one or more reinforcing elements embedded within the matrix. The auxiliary and jumper conduits may comprise a similar composite material construction.

The riser system may comprise a retaining arrangement for retaining the auxiliary conduit in general proximity to the primary conduit. The retaining arrangement may comprise a clamping structure or the like.

In some embodiments the retaining arrangement may facilitate a compliant connection between the primary and auxiliary conduits. This arrangement may permit a degree of floating of the auxiliary conduit relative to the primary conduit at least in one direction or plane. This may, for example, assist to minimise load transference, which in some embodiments may not be desirable in one or more directions or planes. The retaining arrangement may permit the auxiliary conduit to move radially relative to the primary conduit. That is, relative radial movement of the primary and auxiliary conduits may be permitted. The retaining arrangement may permit the auxiliary conduit to move axially relative to the primary conduit. That is, relative axial movement of the primary and auxiliary conduits may be permitted.

The primary and secondary conduits may be rigidly connected together in one plane or direction, and compliantly connected together in another plane or direction. For example, the auxiliary conduit may be radially secured relative to the primary conduit at or via the retaining arrangement, and also may be permitted to move axially relative to the primary conduit. Such an arrangement may retain the auxiliary conduit within a desired proximity of the primary conduit, while permitting a degree of independent axial movement, or floating, of the auxiliary conduit.

The riser system may comprise a plurality of retaining arrangements permitting the auxiliary conduit to be connected relative to the primary conduit at multiple points along the length of the riser system.

The auxiliary conduit and jumper conduit may be provided as a unitary structure. For example, the auxiliary conduit and the jumper conduit may be formed by a common length of conduit formed of or comprising a composite material. In such an arrangement a continuous composite conduit may be deployed, for example from a reel, alongside the primary conduit. In some embodiments the portion of the composite conduit which extends alongside the primary conduit (and thus that portion which defines the auxiliary conduit) may be secured, either compliantly or rigidly, to the primary conduit, for example via one or more retaining arrangements. In this arrangement during deployment of the riser system personnel may facilitate (for example via a suitable access platform) connection of the composite conduit to the primary conduit.

The riser system may be secured or securable to a subsea wellhead, for example to a Blow Out Preventer (BOP), a Lower Marine Riser Package (LMRP), flex joint or the like.

The riser system may comprise a subsea jumper conduit fluidly connected to the auxiliary conduit, for example to a lower end of the auxiliary conduit, and to subsea infrastructure. The subsea infrastructure may comprise a wellhead, BOP, LM RP or the like. The subsea jumper may facilitate communication of fluids delivered along the auxiliary conduit, such as control fluids, to the subsea infrastructure.

In one embodiment the subsea jumper conduit may be arranged to span across subsea infrastructure, such as a flex joint, LM RP or the like.

The subsea jumper conduit may be arranged to accommodate relative movement between the auxiliary conduit and/or primary conduit, and subsea infrastructure.

The subsea jumper conduit may comprise a composite material formed of at least a matrix and one or more reinforcing elements embedded within the matrix. The subsea jumper conduit may comprise the same or substantially the same composite material as the jumper conduit.

The subsea jumper conduit may extend in a curved profile from the auxiliary conduit. Such a curved profile may assist to accommodate appropriate routing of the subsea jumper conduit and/or relative motion between the auxiliary conduit and/or primary conduit, and subsea infrastructure. The curvature of the subsea jumper conduit may vary during relative motion of the vessel and the auxiliary and/or primary conduits.

The subsea jumper conduit may be a separate component which is secured or coupled to the auxiliary conduit.

The auxiliary conduit and subsea jumper conduit may be provided as a unitary structure. For example, the auxiliary conduit and the subsea jumper conduit may be formed by a common length of conduit formed of or comprising a composite material. In such an arrangement a continuous composite conduit may be deployed, for example from a reel, alongside the primary conduit.

In some embodiments the jumper conduit, auxiliary conduit and subsea jumper conduit may be provided as a unitary structure, for example a unitary or single length composite conduit.

The riser system may comprise a plurality of auxiliary conduits. The auxiliary conduits may be circumferentially distributed about the primary conduit. Two or more of the plurality of auxiliary conduits may be configured similarly. Two or more of the plurality of auxiliary conduits may be configured differently.

In embodiments where multiple auxiliary conduits are provided, the riser system may comprise a corresponding number of jumper conduits and/or subsea jumper conduits.

The riser system may comprise a plurality of auxiliary conduits which are evenly or unevenly circumferentially distributed about the primary conduit.

The primary conduit may be of a larger diameter than the auxiliary conduit. In some embodiments the central riser pipe may define an internal diameter of around 21 inches (53.34 cm), and the auxiliary lines may be in the range of 2-4 inches (5.08-10.16 cm) internal diameter.

An aspect or embodiment relates to a method for deploying a riser system according to any other aspect.

The method may comprise deploying the primary conduit and auxiliary conduits, and fluidly connecting the jumper conduit to the auxiliary conduit.

In some embodiments the method may comprise utilising a single length of composite conduit to define both the auxiliary conduit and the jumper conduit.

In some embodiments the riser system may comprise one or more buoyancy aids. For example, a buoyancy aid may be provided in combination with a retaining arrangement used to retain the auxiliary conduit in proximity to the primary conduit.

An aspect or embodiment relates to a riser system, comprising:
 a primary conduit extending between a surface vessel and a subsea location; and
 a composite conduit comprising a composite material formed of at least a matrix and one or more reinforcing elements embedded within the matrix,
 wherein the composite conduit collectively defines a composite auxiliary conduit section which extends adjacent the primary conduit and a composite jumper conduit section which extends from the auxiliary conduit section to the surface vessel.

The composite conduit may also define a subsea jumper conduit section which extends from the auxiliary conduit section to subsea infrastructure.

The riser system may be any riser system, such as any marine riser system. The riser system may comprise or define a drilling riser system. The riser system may comprise or define an intervention or workover riser system.

An aspect or embodiment relates to a riser system, comprising:
 a primary conduit extending between a surface vessel and a subsea location;
 an auxiliary conduit extending adjacent the primary conduit; and
 a subsea composite jumper conduit extending from subsea infrastructure and being fluidly connected to the auxiliary conduit, said subsea jumper conduit comprising a composite material formed of at least a matrix and one or more reinforcing elements embedded within the matrix.

The riser system may be any riser system, such as any marine riser system. The riser system may comprise or define a drilling riser system. The riser system may comprise or define an intervention or workover riser system.

BRIEF DESCRIPTION OF THE DRAWINGS

These and other aspects of the present invention will now be described, by way of example only, with reference to the accompanying drawings, in which:

FIG. 1 is a diagrammatic illustration of a drilling riser system;

FIG. 2 is a cross-sectional view of the drilling riser system of FIG. 1 taken along line 2-2 in FIG. 1;

DETAILED DESCRIPTION OF THE DRAWINGS

Figure 3:
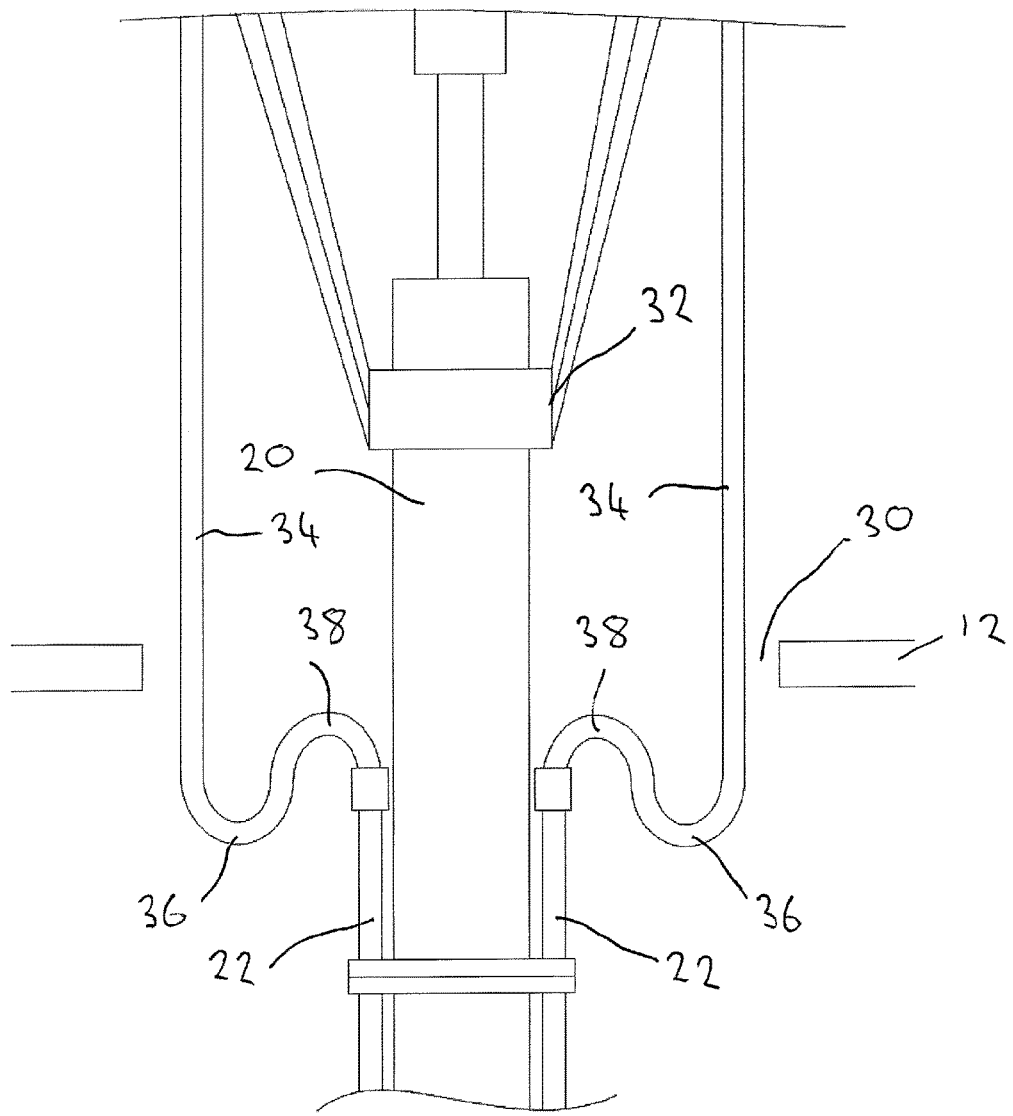
FIG. 3 is a diagrammatic illustration of a prior art jumper arrangement for use with a drilling riser.

A riser system, generally identified by reference numeral 10, in accordance with an embodiment of the present invention is illustrated in FIG. 1. The riser system may be for any appropriate use. However, for the purposes of the present example the riser system is a drilling riser system. The riser system 10 extends between a surface vessel 12, which in the present embodiment is a drilling ship, and a subsea wellhead 14. More specifically, a BOP stack 16 and a LMRP and/or flex joint 18 is interposed between the riser 10 and the wellhead 14. The drilling riser system 10 comprises a central large bore primary conduit 20 and a plurality of smaller auxiliary conduits 22 which are circumferentially distributed around the primary conduit 20, as also illustrated in FIG. 2, which provides a cross-sectional view through line 2-2 in FIG. 1.

In use, the primary conduit 20 accommodates drilling equipment and certain fluids, such as drilling mud and the like, whereas the auxiliary conduits 22 accommodate the communication of other fluids between the surface vessel 12 and the wellhead 14 or associated equipment, such as the BOP 16. Such other fluids may include well kill fluids, purge fluids, choke fluids, control fluids and the like.

In the embodiment shown the drilling riser 10 is formed from multiple riser joints 24, which each include a primary conduit section 20a and an appropriate number of auxiliary conduit sections 22a, wherein the primary conduit and auxiliary conduit sections 20a, 22a extend between opposing flange connectors 26, wherein said flange connectors 26 facilitate fluid tight connection between adjacent riser joints 24.

The primary conduit 20 is supported by the vessel 12, with the auxiliary conduits 22 terminated in the region of the vessel 12 and appropriate jumper conduits provided to facilitate a fluid connection with a vessel mounted fluid system. In one of its embodiments, the present invention provides advantages relating to the jumper conduits. However, in order to demonstrate these advantages it is useful to first provide an illustration of a current known jumper arrangement, which is shown in FIG. 3. In this case the primary conduit 20 extends through a moonpool 30 of the vessel 12, and is secured to a tensioning system 32. Flexible steel jumpers 34 are connected to the auxiliary conduits 22, wherein the jumpers 34 are deployed in a particular spatial configuration to accommodate the relative motion between the riser 10 and vessel 12 which may arise due to a combination of vertical heave and angular rotations. These flexible jumpers 34 are critical items since they must be flexible and reliably accommodate the full wellhead pressure during periods of pressure testing and emergency well control.

In the illustrated prior art arrangement, the flexible steel jumpers 34 are configured with a free hanging catenary section 36 connected to steel goosenecks 38 at the top end of each auxiliary line 22. In order to meet the spatial constraints of the moonpool 30 the flexible jumpers 34 must accommodate a small minimum bend radius, which is a significant design challenge. Also, high pressure ratings will require a significant steel content, thus resulting in high weight. Furthermore, in very high pressure applications (such as up to and beyond 20 Kpsi (1378 Bar)) the convoluted and sagging pipe form may become extremely stiff and thus largely non-compliant.

Figure 4:
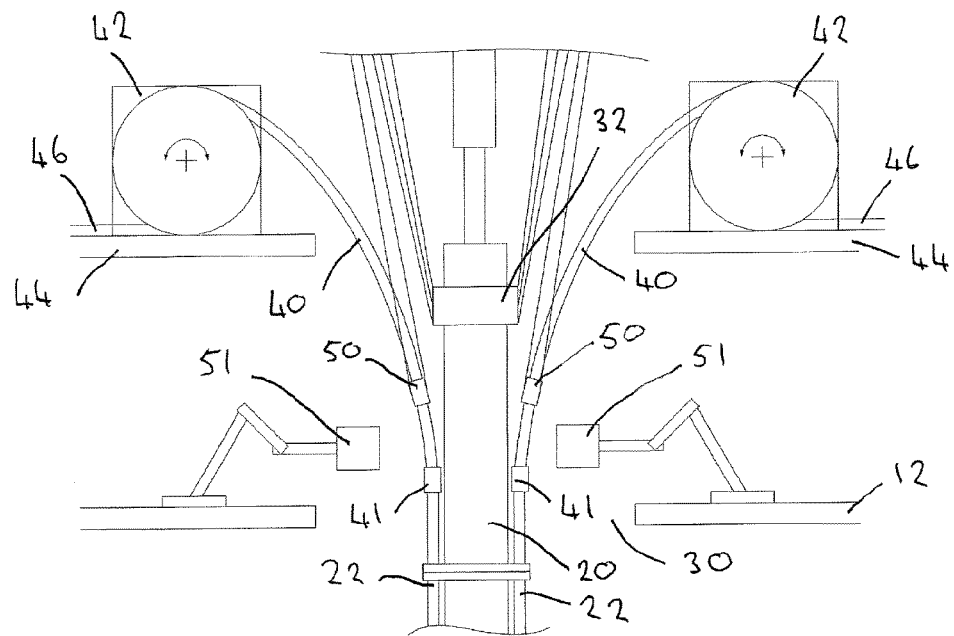
FIG. 4 is a diagrammatic illustration of an upper region of the drilling riser system of FIG. 1.

An embodiment of a jumper arrangement forming part of the drilling riser system 10 of FIG. 1 is illustrated in FIG. 4. In this case the primary conduit 20 extends upwardly through the moonpool 30 of the vessel 12 and is secured to a tensioning system 32, with the auxiliary conduits 22 terminated in the region of the moonpool 30. Each auxiliary line 22 is connected to a respective composite jumper conduit 40 each formed from a composite material formed of at least a matrix (e.g., PEEK) and a plurality of reinforcing elements (e.g., carbon fibres) embedded within the matrix.

Each jumper conduit 40 extends upwardly from a respective auxiliary conduit connector 41 in a generally convex (upwardly convex) curved form to respective reels 42 mounted on a deck 44, for example a drilling deck, of the vessel 12. The jumper conduits 40 extend around their respective reels 42, and each includes an in-board tail portion 46 which facilitates connection to a vessel mounted fluid system (not shown). In other embodiments the jumper conduits 40 may be terminated at the respective reels 42, with appropriate pipework then connecting the reels 42 to the vessel mounted fluid system.

Although not shown in FIG. 4, a guide arrangement, such as guide rollers, may be associated with each jumper conduit 40 to assist in controlling the curvature.

The convex curvature of the jumper conduits 40 may avoid the requirement for additional space to accommodate catenary or sagging sections of the jumpers, as in the prior art arrangement of FIG. 3. Furthermore, the convex curvature of the jumper conduits 40 provides a less complex geometry, which may not suffer from fluid pressure induced stiffness to the same degree as the more complex catenary or sagging prior art form.

During use, the inherent properties of the composite material of the jumper conduits 40 (for example the higher strain rate to specific stress than an equivalent metallic component) may assist in permitting the jumper conduits 40 to accommodate movement of the vessel 12 relative to the riser system 10. Furthermore, in the present embodiment the reels 42 are operable to control the selective paying out and in of the composite jumpers 40 to facilitate additional movement compensation.

The arrangement shown in FIG. 4 illustrates the use of a jumper conduit tensioning arrangement 50. This may assist in ensuring a desired tension is maintained in the jumper conduits 40, for example during changing operation conditions, such as changes in the pressure, density or the like of fluids contained therein.

The reels 42 may also function as suitable storage mechanisms for the jumper conduits 40 prior to deployment, and may also be used to advantageously aid or facilitate deployment. For example, the jumper conduits 40 may be directly deployed from their respective reel 42, and appropriately connected to the auxiliary conduits 22 via the connectors 41. In this respect, such connection may be assisted or performed by personnel, operating via mobile access platforms 51.

Figure 5:
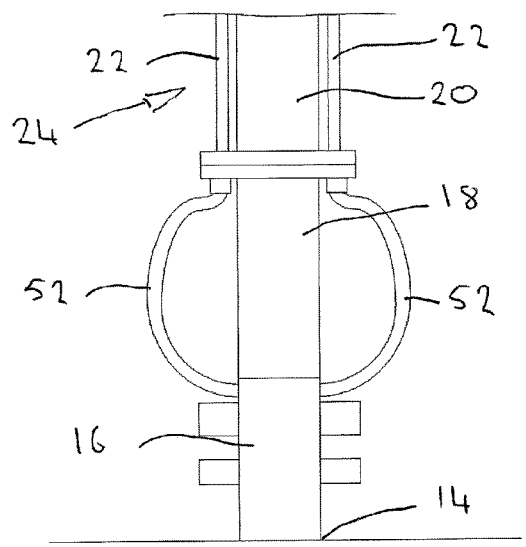
FIG. 5 is a diagrammatic illustration of a lower region of the drilling riser system of FIG. 1.

An enlarged view of the lower end region of the drilling riser 10 of FIG. 1 is illustrated in FIG. 5. In this embodiment subsea jumper conduits 52 are utilised to extend from the auxiliary conduits 22 of the lowermost riser joint 24, to span across the flex joint section 18, and facilitate fluid connection to the BOP 16 (or an associated LMRP). The subsea jumper conduits 52 are formed from a composite material which includes a matrix (e.g., PEEK) and a plurality of reinforcing elements (e.g., carbon fibres) embedded within the matrix.

The subsea jumper conduits 52 extend in a curved profile to assist in accommodating relative movement between the riser system 10 and the BOP 16.

Figure 6:
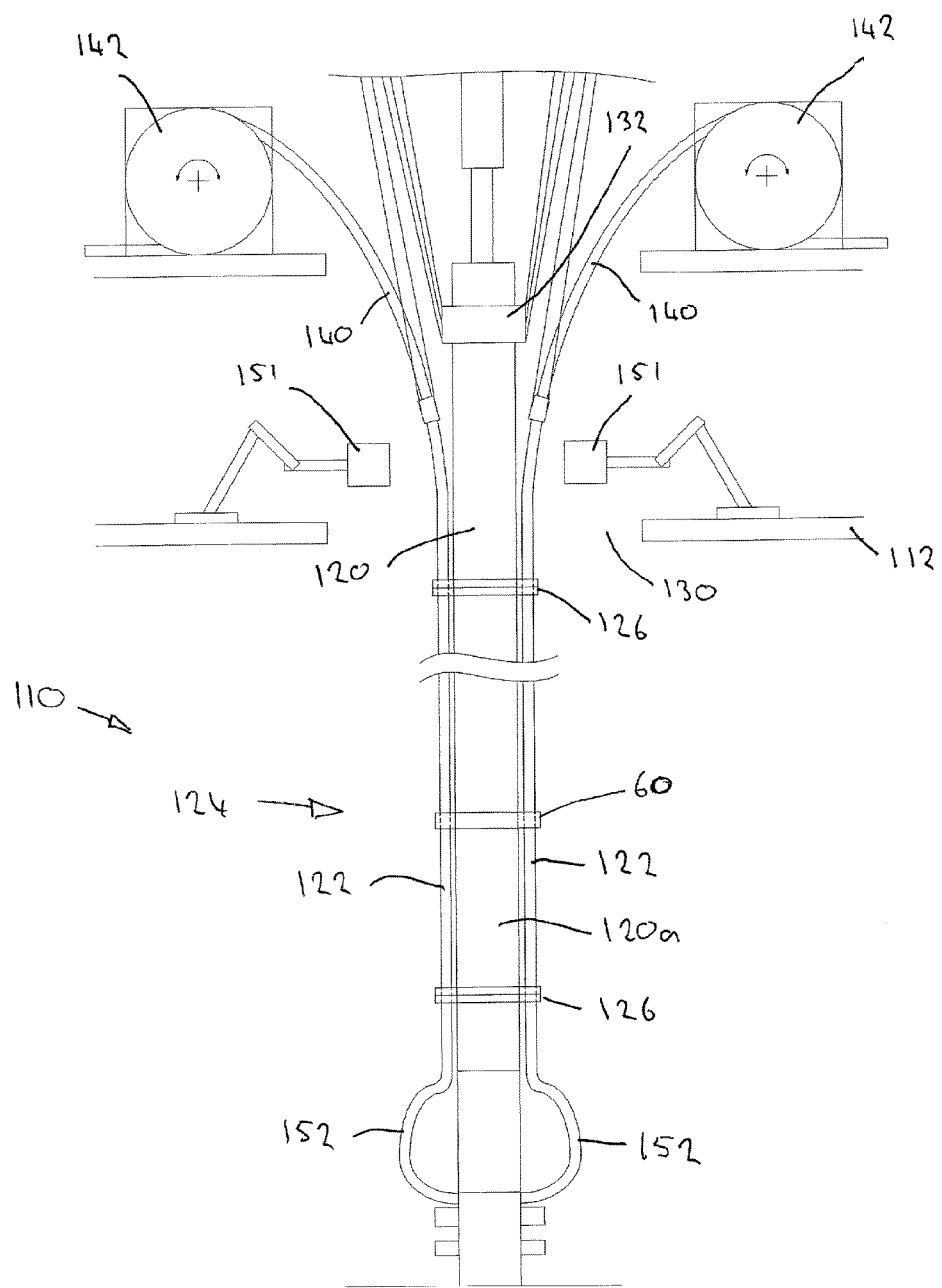
FIG. 6 is a diagrammatic illustration of a drilling riser system in accordance with an alternative embodiment of the present invention.

In the embodiment described above the auxiliary conduits, jumper conduits and subsea jumper conduits are formed from separate components which are fluidly connected together. However, in other embodiments a single continuous length of a composite conduit may be used to define a single auxiliary conduit and associated jumper conduits. Such an arrangement is illustrated in FIG. 6. The embodiment of FIG. 6 is similar to that described above and as such like features share like reference numerals, incremented by 100.

Accordingly, the riser system, generally identified by reference numeral 110, includes a plurality of riser joints 120, in this case composed of individual primary conduit sections 120a extending between end flanges 126 used to permit the individual joints 124 to be connected together to define the primary conduit 120. The primary conduit 120 extends upwardly through a moonpool 130 of a vessel 112 and is supported by a tensioning system 132.

In the present embodiment the individual riser joints 124 do not include discrete sections of auxiliary conduit. Instead, continuous lengths of a composite conduit are deployed from respective reels 142, such that the continuous lengths, when deployed, each define a subsea jumper conduit section 152, an auxiliary conduit section 122 and a jumper conduit section 140. The form and general function of these conduit sections 122, 140, 152 are similar to those described above in connection with riser system 10, and as such no further description will be provided. The use of these continuous conduits may facilitate easier deployment/retrieval, and may minimise problems associated with using multiple sealed connections.

In the present embodiment the portion of each continuous conduit which defines the auxiliary conduit section 122 is radially retained relative to the primary conduit 120. This may be achieved using the individual flange connectors 126, and/or using dedicated retaining arrangements 60. In this respect, while the auxiliary conduit sections 122 are radially retained relative to the primary conduit, the arrangement may be such that the auxiliary conduit sections 122 are permitted to move axially, for example to accommodate axial expansion and contraction, which may arise due to pressure and/or temperature. In some embodiments buoyancy systems may be secured to the riser system, for example via the retaining arrangements, to reduce the required capacity of the tensioning system 132.

During deployment of the individual continuous conduits, personnel, operating from mobile access platforms 151, may ensure suitable connection of the auxiliary conduit sections to the primary conduit 120.

It should be understood that the embodiments described herein are merely exemplary and that various modifications may be made thereto without departing from the scope of the invention. For example, in some embodiments only the auxiliary conduit and associated jumper conduit may be integrally formed. Alternatively, only the auxiliary conduit and associated subsea jumper conduit may be integrally formed. In some embodiments, the riser system may be configured for use in intervention or work-over operations.

The invention claimed is:

1. A riser system, comprising:
a primary conduit extending between a surface vessel and a subsea location;
an auxiliary conduit extending adjacent the primary conduit; and
a composite jumper conduit extending from the surface vessel and being fluidly connected to the auxiliary conduit, said jumper conduit comprising a composite material formed of at least a matrix and one or more reinforcing elements embedded within the matrix wherein the jumper conduit is located entirely above the auxiliary conduit, wherein the jumper conduit extends in a curved profile without defining any inflection point, wherein the jumper conduit is mounted on a reel located on the vessel and wherein the reel is operable to rotate to selectively pay-in and pay-out the jumper conduit therefrom to accommodate relative movement between the vessel and the auxiliary and/or primary conduits.

2. The riser system according to claim 1, defining a drilling riser system.

3. The riser system according to claim 1, wherein the composite material of the composite jumper conduit exhibits a higher strain rate to specific stress than an equivalent metallic component.

4. The riser system according to claim 1, wherein the composite material of the composite jumper conduit is formed to withstand or permit axial and/or bending strains of at least one of up to 6%, up to 4%, up to 2% and up to 1%.

5. The riser system according to claim 1, wherein the jumper conduit extends upwardly in a curved profile from the auxiliary conduit.

6. The riser system according to claim 1, wherein the composite jumper conduit extends upwardly from the auxiliary conduit in a generally convex curved profile.

7. The riser system according to claim 6, wherein the composite jumper conduit extends from frog the auxiliary conduit to define an upwardly convex curved profile.

8. The riser system according to claim 1, wherein the jumper conduit extends to define an elbow-form.

9. The riser system according to claim 1, wherein the jumper conduit extends from a generally vertical orientation adjacent the auxiliary conduit, to a generally horizontal orientation on or adjacent the vessel.

10. The riser system according to claim 9, wherein a continuous generally convex curve is defined between the vertical and horizontal oriented sections of the jumper conduit.

11. The riser system according to claim 1, wherein the jumper conduit is connected to a fluid system on the vessel.

12. The riser system according to claim 1, wherein an outboard end of the jumper conduit extends from the reel to be fluidly connected to the auxiliary conduit, and an inboard end of the jumper conduit is connected to a fluid system on the vessel.

13. The riser system according to claim 1, wherein the reel is mounted on a skid arrangement mounted on the vessel, the skid arrangement facilitating movement of the reel on the vessel.

14. The riser system according to claim 1, comprising a jumper conduit tensioning arrangement to assist in controlling tension applied along or in discrete portions of the jumper conduit.

15. The riser system according to claim 1, comprising a continuous primary conduit.

16. The riser system according to chasm 1, comprising a modular primary conduit having a plurality of discrete primary conduit sections or joints secured together in end-to-end relation along the length of the riser system.

17. The riser system according wherein the primary conduit comprises a metal or metal alloy.

18. The riser system according to claim 1, wherein the primary conduit comprises a composite material formed of at least a matrix and one or more reinforcing elements embedded within the matrix.

19. The riser system according to claim 1, wherein the auxiliary conduit comprises a continuous auxiliary conduit.

20. The riser system according to claim 1, comprises a modular auxiliary conduit having a plurality of discrete auxiliary conduit sections secured together in end-to-end relation along the length of the riser system.

21. The rises system according to claim 1, wherein the auxiliary conduit comprises a metal or metal alloy.

22. The riser system according to claim 1, wherein the auxiliary conduit comprises a composite material formed of at least a matrix and one acre reinforcing elements embedded within the matrix.

23. The riser system according to claim 1, wherein the auxiliary conduit and jumper conduit are provided as a unitary structure such that the auxiliary conduit and the jumper conduit are formed by a common length of conduit formed of or comprising a composite material.

24. The riser system according to claim 1, comprising a subsea jumper conduit fluidly connected between the auxiliary conduit and subsea infrastructure, wherein the subsea jumper conduit accommodates relative movement between the auxiliary conduit and/or primary conduit, and subsea infrastructure.

25. The riser system according to claim 24, wherein the subsea jumper conduit comprises a composite material formed of at least a matrix and one or more reinforcing elements embedded within the matrix.

26. The riser system according to claim 24, wherein the subsea jumper conduit extends in a curved profile from the auxiliary conduit.

27. The riser system according to claim 24, wherein the subsea jumper conduit is a separate component which is secured or coupled to the auxiliary conduit.

28. The riser system according to claim 24, wherein the auxiliary conduit and subsea jumper conduit are provided as a unitary structure, such that the auxiliary conduit and the subsea jumper conduit are formed by a common length of conduit formed of or comprising a composite material.

29. A method for deploying a riser system, comprising:
   deploying a primary conduit from a surface vessel to a subsea location;
   deploying an auxiliary conduit to extend adjacent the primary conduit; and
   extending a composite jumper from the surface vessel, wherein the composite jumper is fluidly connected to the auxiliary conduit, said jumper conduit comprising a composite material formed of at least a matrix and one or more reinforcing elements embedded within the matrix wherein the jumper conduit is deployed to be entirely above the auxiliary conduit and to extend in a curved profile without defining any inflection point,
   mounting the jumper conduit on a reel located on the vessel, the reel being operable to rotate to selectively pay-in and pay-out the jumper conduit therefrom to accommodate relative movement between the vessel and the auxiliary and/or primary conduits.

30. The method according to claim 29, con rising utilizing a single length of composite conduit to define both the auxiliary conduit and the jumper conduit.

\* \* \* \* \*